United States Patent Office 3,238,190
Patented Mar. 1, 1966

3,238,190
AESCIN RECOVERY
Hans Erbring, Cologne, and Wilhelm Winkler, Cologne-Vingst, Germany, assignors to Firma Dr. Madaus & Co. K.G., Cologne-Merheim, Germany
No Drawing. Filed Oct. 23, 1963, Ser. No. 318,153
5 Claims. (Cl. 260—210.5)

This invention relates to the preparation of pure aescin and salts thereof from horse chestnuts.

This application is a continuation-in-part of our application Serial No. 85,992, filed January 31, 1961 now abandoned.

Extracts of horse chestnut seeds (*Aesculus hippocastanum L.*) have long been used in folk medicine against various ailments, particularly piles and varicose veins.

In modern times, it has been recognized that the active principle of the seeds is an acid saponin, the aescin, which has been proven to be particularly effective in the treatment of edemas. The aescin has the composition $C_{54}H_{84}O_{23}$. It is a triterpenoid saponin with one mole each of glucose, xylose, and glucuronic acid attached to the structure in glucosidic linkage. On alkaline hydrolysis, one mole each of tiglic acid and acetic acid is observed. The aglycone has the formula

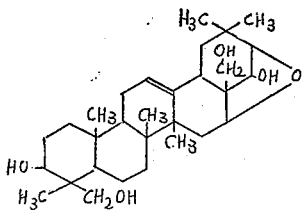

Aescin is considerably more effective than other saponins which have been available such as the Gypsophila saponin. Nonetheless, its application was limited because it was difficult to prepare the saponin in pure form and to offer it for therapeutic use as a composition of the required uniform quality.

It is, therefore, a principal object of the invention to provide a simple and reliable method for preparing aescin and its sodium salt in crystallized and pure form.

It is another object of the invention to provide aescin containing solutions suitable for injection.

Other objects and advantages will be apparent from a consideration of the specification and claims.

We have found that crude aqueous-alcoholic extracts of horse chestnuts when treated with a cation exchange resin, precipitate directly purse aescin. For this purpose, it is essential to use for the extraction a solution containing 40 to 60, preferably about 50 percent of alcohol. This concentration appears to be critical to obtain in the final crystallization step a pure aescin free from related products or degradation compounds and free from any fatty or mineral impurities so that it is not even necessary to subject the horse chestnuts to a preliminary defatting treatment.

As alcohol, we may use any lower alcohol such as methanol, ethanol, and propanol.

Before passing the aqueous-alcoholic solution through the cation exchange resin, it is preferably made stronger alcoholic to increase the solubility of the aescin and to prevent precipitation thereof in the resin column and clogging of the resin. It is not advisable to use such stronger alcoholic solution for the extraction because undesirable components of the seeds would then be extracted too.

Suitable cation exchange resins are the strongly acid resins of the nuclear sulfonic polystyrene base type such as sulfonated styrene divinylbenzene copolymers represented by Amberlite IR-120 (Röhm and Haas), Lewatit S-100, I Merck, or resins of the phenolic methylene sulfonic type such as Amberlite IR-100. The horse chestnut extract is either passed through a column of the resin or stirred with the resin. Thereby, the aescin is obtained according to the reaction $$X-\text{aescinate} + H_R \rightarrow X_R + H-\text{aescinate} (=\text{aescin})$$

wherein X designates the cation and the subscript R indicates the resin. The obtained solution precipitates the aescin when concentrated by distilling off alcohol which will be recovered.

The beginning crystallization is recognized by formation of silky glossy streaks, and the solution is then allowed to stand until completion of the crystallization. The obtained leafy crystals of aescin are recovered by filtration or centrifuging and have, even without recrystallization, a melting point of 224–226° C.

The thus obtained aescin can be converted to the sodium salt by any conventional procedure. For instance, it may be dissolved directly in an aqueous solution such as a solution of sodium bicarbonate or sodium hydroxide, regarding the stoichiometric conditions or it can be treated with a cation exchange resin operating on the sodium cycle.

The sodium aescinate has a considerably higher solubility in water than the aescin itself. It is therefore preferable for therapeutic use, and we prepare ampoules containing powdery sodium aescinate which for injections is then dissolved in a physiological salt solution (0.85% NaCl), to solutions containing 1 to 5 mg./ml. of the salt.

The following example illustrates the best way known to us to carry out the invention.

Example 500 g. of pulverized horse chestnut seeds were extracted two times for 1 hour with two and a half liter each of aqueous 50% methanol with stirring. The solution was filtered from the seeds, additional methanol was added thereto to increase the methanol concentration to 65%, and then it was filtered again.

The thus obtained solution containing the extracted saponin had a pH of 5 and was passed through a column of 500 ml. (wet volume) of a cation exchange resin of the type defined hereinabove (Lewatit S-100 of Farbenfabriken Bayer A.G.) which had been treated with 65% methanolic 1% sulfuric acid and then had been washed neutral with 65% methanol.

The solution leaving the resin bed had a pH in the range of about 3 to 4 and was concentrated by distillation to about ⅘ of its original volume. On cooling, crystallization of the aescin started, and the solution was allowed to stand until the crystallization had been completed.

Aescin having a melting point of 224–226° C. was obtained in a yield of 2 percent, calculated on the starting material.

Sodium aescinate was obtained by dissolving the aescin in ethanol, adding the stoichiometric amount of sodium bicarbonate dissolved in a small amount of water, and evaporating the solvent in vacuo. Lewatit S-100 is a polystyrene sulfonic resin.

We claim:

1. A method of preparing aescin of therapeutic purity comprising extracting horse chestnut seeds with a 40 to 60 percent aqueous solution of a lower aliphatic alcohol, separating the aescin containing solution from the solid residue, contacting said aqueous-alcoholic solution with a cation exchange resin in the hydrogen cycle, separating the effluent solution from the resin, precipitating aescin in said solution, and separating the precipitated aescin from the solution.

2. A method of preparing aescin of therapeutic purity comprising extracting horse chestnut seeds with a 40 to 60 percent aqueous solution of a lower aliphatic alcohol, separating the aescin containing solution from the solid residue, increasing the concentration of said alcohol in the solution to about 65 percent, passing the solution through a column of a cation exchange resin in the hydrogen cycle, concentrating the effluent solution below the solubility limit of the aescin, and recovering the precipitated aescin.

3. A method of preparing aescin of therapeutic purity comprising extracting horse chestnut seeds with a 40 to 60 percent aqueous solution of a lower aliphatic alcohol, separating the aescin containing solution from the solid residue, increasing the concentration of said alcohol in the solution to about 65 percent, stirring the solution with a cation exchange resin in the hydrogen cycle, separating the solution from the resin, concentrating the solution below the solubility limit of the aescin, and recovering the precipitated aescin.

4. A method of preparing aescin of therapeutic purity comprising extracting horse chestnut seeds with a 40 to 60 percent aqueous solution of a lower aliphatic alcohol, separating the aescin containing solution from the solid residue, stirring the solution with a cation exchange resin in the hydrogen cycle, thereby precipitating at least part of the aescin, separating the solution rendered cloudy by precipitated aescin from the resin, and recovering the aescin.

5. The method as claimed in claim 1 wherein said cation exchange resin, prior to its contact with said solution, is washed with a dilute aqueous alcoholic acid solution until substantially saturated with said acid and is then washed neutral with an aqueous alcohol solution.

References Cited by the Examiner

UNITED STATES PATENTS

| 2,790,793 | 4/1957 | Boedecker | 260—210.5 |
| 3,110,711 | 11/1963 | Wagner et al. | 260—210.5 |

FOREIGN PATENTS

| 668,951 | 8/1963 | Canada. |

OTHER REFERENCES

Kariyone et al. "Chem. Abst., vol. 52, 1958, p. 13683 f.

LEWIS GOTTS, *Primary Examiner.*